United States Patent
Tomiyama et al.

(10) Patent No.: US 9,822,018 B2
(45) Date of Patent: Nov. 21, 2017

(54) WATER AMOUNT CONTROLLING METHOD AND DESALINATION SYSTEM

(71) Applicant: Panasonic Intellectual Property Management Co., Ltd., Osaka (JP)

(72) Inventors: Morio Tomiyama, Nara (JP); Hisaaki Gyoten, Osaka (JP); Norihisa Mino, Osaka (JP); Akira Taomoto, Kyoto (JP); Atsushi Ono, Kyoto (JP); Stephen William John, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 475 days.

(21) Appl. No.: 14/554,380

(22) Filed: Nov. 26, 2014

(65) Prior Publication Data
US 2015/0075965 A1 Mar. 19, 2015

Related U.S. Application Data

(63) Continuation of application No. PCT/JP2014/001705, filed on Mar. 25, 2014.

(30) Foreign Application Priority Data

Mar. 28, 2013 (JP) ................................. 2013-070214

(51) Int. Cl.
*C02F 1/04* (2006.01)
*B01D 1/00* (2006.01)
(Continued)

(52) U.S. Cl.
CPC .............. *C02F 1/043* (2013.01); *B01D 1/00* (2013.01); *B01D 1/22* (2013.01); *B01D 3/42* (2013.01);
(Continued)

(58) Field of Classification Search
CPC ... C02F 1/043; C02F 1/08; B01D 1/00; B01D 1/22; B01D 3/42; B01D 5/0027; Y02W 10/37
See application file for complete search history.

(56) References Cited

U.S. PATENT DOCUMENTS

| 5,270,080 A | 12/1993 | Mino et al. |
| 8,652,303 B2 | 2/2014 | Mino et al. |
| 2012/0138448 A1 | 6/2012 | Mino et al. |

FOREIGN PATENT DOCUMENTS

| JP | 60-013206 | 1/1985 |
| JP | 04-256466 | 9/1992 |

(Continued)

OTHER PUBLICATIONS

International Search Report dated May 13, 2014 in International (PCT) Application No. PCT/JP2014/001705.

*Primary Examiner* — Brian McCaig
(74) *Attorney, Agent, or Firm* — Wenderoth, Lind & Ponack, L.L.P.

(57) ABSTRACT

A water amount controlling method according to the present disclosure includes: opening a discharge valve that discharges a liquid from a water tank if an impurity concentration is higher than or equal to a first reference value, and opening a sluice gate that introduces the liquid to the water tank a predetermined period after opening the discharge valve, the first reference value being lower than a saturation concentration; throttling the discharge valve and the sluice gate if the impurity concentration is higher than or equal to a second reference value and the temperature is lower than or equal to a third reference value, the second reference value being lower than the first reference value; and closing the discharge valve if the impurity concentration is lower than the second reference value, and closing the sluice gate a predetermined period after closing the discharge valve.

6 Claims, 9 Drawing Sheets

(51) Int. Cl.
    *B01D 1/22*           (2006.01)
    *B01D 3/42*           (2006.01)
    *C02F 1/08*           (2006.01)
    *B01D 5/00*           (2006.01)
    *C02F 103/08*        (2006.01)

(52) U.S. Cl.
    CPC .............. *B01D 5/0027* (2013.01); *C02F 1/08* (2013.01); *C02F 2103/08* (2013.01); *C02F 2209/02* (2013.01); *C02F 2209/42* (2013.01); *Y02W 10/37* (2015.05)

(56) References Cited

FOREIGN PATENT DOCUMENTS

| | | |
|---|---|---|
| JP | 07-063670 | 7/1995 |
| WO | 2012/060036 | 5/2012 |

# WATER AMOUNT CONTROLLING METHOD AND DESALINATION SYSTEM

CROSS REFERENCE TO RELATED APPLICATION

This is a continuation application of PCT International Application No. PCT/JP2014/001705 filed on Mar. 25, 2014, designating the United States of America, which is based on and claims priority of Japanese Patent Application No. 2013-070214 filed on Mar. 28, 2013. The entire disclosures of the above-identified applications, including the specifications, drawings and claims are incorporated herein by reference in their entirety.

FIELD

One or more exemplary embodiments disclosed herein relate generally to a water amount controlling method and a desalination system for obtaining fresh water from a liquid.

BACKGROUND

As a technique for generating fresh water at locations where such water is not easily available, the one of generating fresh water from seawater has been known. For example, Patent Literature (PTL) 1 discloses a desalinating method using water-repellent particles.

CITATION LIST

Patent Literature

[PTL 1] WO2012/060036

SUMMARY

Technical Problem

However, the method in the background art has a problem that impurities are deposited over time on a surface layer of a water-repellent particle layer, thus reducing a desalination efficiency, which indicates an amount of fresh water generated per unit time.

One non-limiting and exemplary embodiment provides a water amount controlling method and a desalination system that suppress the reduction in the desalination efficiency.

Solution to Problem

In one general aspect, the techniques disclosed here feature a water amount controlling method according to one aspect of the present disclosure is a water amount controlling method for a desalination system including: a water tank having a space for storing a liquid; a water-repellent particle layer that is located below the water tank and contains a plurality of water-repellent particles; a liquefying layer that is located below the water-repellent particle layer and liquefies water vapor that has passed through the water-repellent particle layer to obtain fresh water; a sensor that measures a temperature of the liquid stored in the water tank and an impurity concentration of the liquid; and a control unit that controls an amount of the liquid to be introduced to or discharged from the water tank based on a measurement result of the sensor. The water amount controlling method includes: opening a discharge valve that discharges the liquid from the water tank if the impurity concentration measured by the sensor is higher than or equal to a first reference value, and opening a sluice gate that introduces the liquid to the water tank a predetermined period after opening the discharge valve, the first reference value being lower than a saturation concentration; throttling the discharge valve and the sluice gate if the impurity concentration measured by the sensor is higher than or equal to a second reference value and the temperature measured by the sensor is lower than or equal to a third reference value, the second reference value being lower than the first reference value; and closing the discharge valve if the impurity concentration measured by the sensor is lower than the second reference value, and closing the sluice gate a predetermined period after closing the discharge valve. The opening, the throttling and the closing are performed by the control unit.

General and specific aspect disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

With the water amount controlling method and the desalination system according to one or more exemplary embodiments or features disclosed herein, it becomes possible to suppress the reduction in the desalination efficiency.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT(S)

Figure 1:
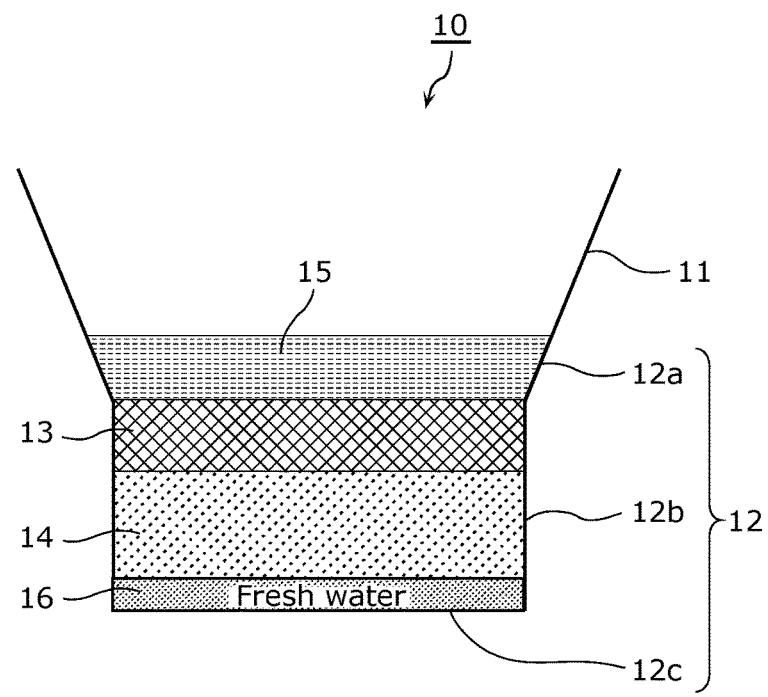
FIG. 1 illustrates an exemplary configuration of a desalination apparatus with a basic configuration.

In the present description, "water repellency" means a property of rejecting water.

According to an exemplary embodiment disclosed herein, a water amount controlling method for a desalination system includes: a water tank having a space for storing a liquid; a water-repellent particle layer that is located below the water tank and contains a plurality of water-repellent particles; a liquefying layer that is located below the water-repellent particle layer and liquefies water vapor that has passed through the water-repellent particle layer to obtain fresh water; a sensor that measures a temperature of the liquid stored in the water tank and an impurity concentration of the liquid; and a control unit that controls an amount of the liquid to be introduced to or discharged from the water tank based on a measurement result of the sensor. The water amount controlling method includes: opening a discharge valve that discharges the liquid from the water tank if the impurity concentration measured by the sensor is higher than or equal to a first reference value, and opening a sluice gate that introduces the liquid to the water tank a predetermined period after opening the discharge valve, the first reference value being lower than a saturation concentration; throttling the discharge valve and the sluice gate if the impurity concentration measured by the sensor is higher than or equal to a second reference value and the temperature measured by the sensor is lower than or equal to a third reference value, the second reference value being lower than the first reference value; and closing the discharge valve if the impurity concentration measured by the sensor is lower than the second reference value, and closing the sluice gate a predetermined period after closing the discharge valve. The opening, the throttling and the closing are performed by the control unit.

With this configuration, it is possible to always keep the impurity concentration lower than the saturation concentration and the temperature of the liquid higher than or equal to a predetermined temperature. Thus, the reduction in the amount of water vapor passing through the water-repellent particle layer can be suppressed, and the extension of time needed for evaporating the liquid can be prevented. This helps to suppress the reduction in the desalination efficiency.

Here, for example, the sensor may be located at a position above the water-repellent particle layer and at a bottom of the water tank.

With this configuration, it is possible to measure the impurity concentration and the temperature of the liquid near an interface between the water-repellent particle layer and the water tank. Consequently, the temperature of the liquid near the interface can be kept higher than or equal to a predetermined temperature, so that the extension of time needed for evaporating the liquid can be suppressed. This helps to further suppress the reduction in the amount of water vapor passing through the water-repellent particle layer.

Also, for example, the sensor may include a temperature sensor that measures the temperature of the liquid stored in the water tank, and a concentration sensor that measures the impurity concentration of the liquid stored in the water tank, and the concentration sensor may be located in the water tank at a position closer to a position of the discharge valve than to where the liquid is introduced from the sluice gate to the water tank.

With this configuration, the impurity concentration of the liquid near the discharge valve, which is likely to be highest within the water tank, can be measured, thus making it possible to keep the impurity concentration of the entire liquid within the water tank lower than the saturation concentration. This helps to suppress the reduction in the desalination efficiency.

Furthermore, for example, the temperature sensor may be located in the water tank at a position closer to where the liquid is introduced from the sluice gate than to the position of the discharge valve.

With this configuration, the temperature of the liquid at the above-noted position, which is likely to be lowest within the water tank, can be measured, thus making it possible to keep the temperature of the entire liquid within the water tank higher than or equal to a predetermined temperature, so that the extension of time needed for evaporating the liquid can be suppressed. This helps to suppress the reduction in the desalination efficiency.

Moreover, in order to solve the problem described above, a water amount controlling method according to one aspect of the present disclosure further includes: heating and evaporating the liquid above the water-repellent particle layer to generate water vapor; and liquefying the water vapor in the liquefying layer to obtain the fresh water.

This makes it possible to always keep the impurity concentration lower than the saturation concentration and the temperature of the liquid higher than or equal to a predetermined temperature. Thus, the reduction in the amount of water vapor passing through the water-repellent particle layer can be suppressed, and the extension of time needed for evaporating the liquid can be suppressed. This helps to suppress the reduction in the desalination efficiency.

According to an exemplary embodiment disclosed herein, a desalination system includes: a desalination apparatus including a water tank having a space for storing a liquid, a water-repellent particle layer that is located below the water tank and contains a plurality of water-repellent particles, and a liquefying layer that is located below the water-repellent particle layer and liquefies water vapor that has passed through the water-repellent particle layer to obtain fresh water; a sensor that measures a temperature of the liquid stored in the water tank and an impurity concentration of the liquid; a discharge valve that discharges the liquid stored in the water tank; and a control unit configured to control an amount of the liquid to be introduced to or discharged from the water tank based on a measurement result of the sensor. The control unit opens the discharge valve if the impurity concentration measured by the sensor is higher than or equal to a first reference value, and opens a sluice gate that introduces the liquid to the water tank a predetermined period after opening the discharge valve, the first reference value being lower than a saturation concentration; throttles the discharge valve and the sluice gate if the impurity concentration measured by the sensor is higher than or equal to a second reference value and the temperature measured by the sensor is lower than or equal to a third reference value, the second reference value being lower than the first reference value; and closes the discharge valve if the impurity concentration measured by the sensor is lower than the second reference value, and closes the sluice gate a predetermined period after closing the discharge valve.

With this configuration, it is possible to always keep the impurity concentration lower than the saturation concentration and the temperature of the liquid higher than or equal to a predetermined temperature. Thus, the reduction in the amount of water vapor passing through the water-repellent particle layer can be suppressed, and the extension of time needed for evaporating the liquid can be suppressed. This helps to suppress the reduction in the desalination efficiency.

It should be noted that these generic aspects or specific aspects serving as a part thereof may be implemented by a system, a method, an integrated circuit, a computer program or a computer-readable recording medium such as a CD-ROM, or by an arbitrary combination of a system, a method, an integrated circuit, a computer program and a recording medium.

The following is a specific description of each embodiment, with reference to the accompanying drawings.

It should be noted that any embodiment described below will illustrate a generic or specific example. The numerical values, shapes, materials, structural components, the arrangement of the structural components, steps and the order of the steps mentioned in the following embodiment are merely an example and not intended to limit the present disclosure. Further, among the structural components in the following embodiment, the one that is not recited in any independent claim exhibiting the most generic concept will be described as an arbitrary structural component.

Embodiment 1

[Desalination Apparatus with Basic Configuration]

The following describes a desalination apparatus 10 with a basic configuration and a desalination process thereof with reference to the drawings before describing a desalination system according to an embodiment. FIG. 1 is a sectional view illustrating a configuration of the desalination apparatus 10 with the basic configuration.

The desalination apparatus 10 shown in FIG. 1 includes a water tank 11, a water-repellent particle layer 13 and a liquefying layer 14. The water tank 11, the water-repellent particle layer 13 and the liquefying layer 14 are located in this order from above.

Here, the water tank 11 has a lateral surface surrounded by an upper side wall 12a of a vessel 12 and a bottom surface covered with the water-repellent particle layer 13, such that a space for storing a liquid (a reservoir layer) is defined therein. In the desalination apparatus 10, the liquid stored in the water tank 11 (a liquid layer 15) is evaporated to be water vapor. The water vapor passes through the water-repellent particle layer 13. The water vapor that has passed through the water-repellent particle layer 13 is liquefied in a liquefying layer 14 so as to become water (fresh water).

Hereinafter, each configuration will be described in detail.

<Water Tank 11>

The water tank 11 may have any shape such as a rectangle or a circle when seen from a plan view (a top view). The lateral surface of the water tank 11 is formed of the upper side wall 12a of the vessel 12, and the bottom surface thereof is formed of an upper surface of the water-repellent particle layer 13.

Here, the vessel 12 will be described. The vessel 12 shown in FIG. 1 includes a lower side wall 12b that extends vertically, the upper side wall 12a that is connected to the lower side wall 12b and inclined so as to expand upwardly, and a base plate 12c that is connected to the lower side wall 12b. The upper side wall 12a is not necessarily inclined so as to expand upwardly, but may extend vertically similarly to the lower side wall 12b. However, since the upper side wall 12a sometimes corresponds to a flow channel of a liquid when the liquid is introduced to the water tank 11, it is favorable that the upper side wall 12a be inclined so as to expand upwardly in order to reduce energy of the liquid to be introduced to the water tank 11.

The vessel 12 is formed such that the upper side wall 12a, the lower side wall 12b and the base plate 12c surround surfaces other than an upper surface of the water tank 11.

In a lower portion of the vessel 12, lateral portions of the water-repellent particle layer 13 and the liquefying layer 14 described later are entirely surrounded by the lower side wall 12b, and a bottom surface of the liquefying layer 14 is held by the base plate 12c. The vessel 12 allows fresh water obtained by desalination to be held in the liquefying layer 14.

Each of the lower side wall 12b and the upper side wall 12a is formed of a water repellent material. An exemplary material for each of the lower side wall 12b and the upper side wall 12a is a metal sheet, concrete, a waterproof sheet or clay.

As described above, the vessel 12 has a shape of a bottomed tube, includes the upper side wall 12a that has a tubular shape whose upper opening is larger than its lower opening, the lower side wall 12b that has a tubular shape whose upper opening contacts the lower opening of the upper side wall 12a, and the base plate 12c that closes a lower opening of the lower side wall 12b, and receives the water tank 11, the water-repellent particle layer 13 and the liquefying layer 14 therein. Incidentally, the vessel 12 is not limited to the shape of a bottomed tube, but may be provided, for example, as a recessed portion dug in the ground, in which the water tank 11, the water-repellent particle layer 13 and the liquefying layer 14 are located. Also, the lower side wall 12b and the upper side wall 12a are not limited to have a water repellency but may have a water proof property.

The liquid poured (introduced) into the water tank 11 forms the liquid layer 15 in the water tank 11. In other words, the liquid forms the liquid layer 15 above the upper surface of the water-repellent particle layer 13 and inside the vessel 12 (a space surrounded by the upper side wall 12a).

It is noted that the desalination apparatus 10 may have an introduction passage for introducing the liquid to the water tank 11. On the other hand, when the desalination apparatus 10 does not have the introduction passage, the liquid may be introduced into the water tank 11 from an opening of the water tank 11 (an opening of the vessel 12). Here, the liquid to be introduced to the water tank 11 is transparent or translucent, for example.

The liquid that has been poured into the water tank 11 and formed the liquid layer 15 does not fall down to the liquefying layer 14 because the water-repellent particle layer 13 and the upper side wall 12a have water repellency. In other words, the liquid that has been poured into the water tank 11 is overlaid on the upper surface of the water-repellent particle layer 13 whose perimeter is surrounded by the upper side wall 12a, and maintained as the liquid layer 15. The height of the liquid layer 15 (a liquid level of the liquid layer 15) is, for example, 1 mm to 50 cm. When the height of the liquid layer 15 is too great (for example, larger than 50 cm), it takes time to heat the liquid as described later. Thus, a great amount of heat capacity is needed, resulting in decreased efficiency of desalinating the liquid. On the other hand, when the height of the liquid layer 15 is too small (for example, smaller than 1 mm), the efficiency of desalinating the liquid is excessively reduced. Accordingly, the height of the liquid layer 15 within the above-noted numerical range makes it possible to keep an appropriate desalination efficiency.

As described above, the lateral surface of the water tank 11 is formed of the upper side wall 12a of the vessel, and the bottom surface thereof is formed of the water-repellent particle layer 13. The water tank 11 holds as the liquid layer 15 the liquid that has been introduced from an outside of the desalination apparatus 10.

It should be noted that the water tank 11 may include a heater for heating the liquid layer 15 in the water tank 11. In this case, the heater is disposed on the upper side wall 12a of the water tank 11, for example.

<Water-Repellent Particle Layer 13>

The water-repellent particle layer 13 is located below the water tank 11. The upper surface of the water-repellent particle layer 13 forms the bottom surface of the water tank 11. When the liquid is poured into the water tank 11, the water-repellent particle layer 13 is located in contact with the lower surface of the liquid layer 15. As shown in FIG. 1, a lateral surface of the water-repellent particle layer 13 may be surrounded by the lower side wall 12b.

The water-repellent particle layer 13 contains at least a plurality of water-repellent particles. Each of the water-repellent particles includes a particle and a water-repellent film that coats a particle surface. The water-repellent particles are particles whose surfaces have water repellency.

The water-repellent particle layer 13 is formed of a large number of the water-repellent particles that are clustered together. In other words, the surface of one water-repellent particle is in contact with the surfaces of other water-repellent particles. Each of the water-repellent particles includes the particle and the water-repellent film coating the particle surface, and has water repellency. At this time, between the water-repellent particles that are in contact with each other, the water-repellent particle layer 13 has a gap through which the water vapor obtained by heating and evaporating the liquid can pass. Since the water-repellent particle layer 13 includes the plurality of water-repellent particles, it is possible to reduce the liquid entering the inside of the water-repellent particle layer 13.

The lower side wall 12b may surround the lateral surface of the water-repellent particle layer 13 entirely. By doing so, it becomes possible to reduce the liquid entering the inside of the water-repellent particle layer 13. Since the plurality of water-repellent particles forming the water-repellent particle layer 13 have water repellency and thus can reduce the liquid entering the inside of the water-repellent particle layer 13, it is not essential to provide the lower side wall 12b.

The particles include gravel, sand, silt and clay. The gravel corresponds to particles having a particle size of greater than 2 mm and not greater than 75 mm. The sand corresponds to particles having a particle size of greater than 0.075 mm and not greater than 2 mm. The silt corresponds to particles having a particle size of greater than 0.005 mm and not greater than 0.075 mm. The clay corresponds to particles having a particle size of not greater than 0.005 mm.

The water-repellent film coats the surface of each of the particles. The water-repellent film may include a fluorocarbon group represented by the chemical formula $-(CF_2)_n-$. Here, n is a natural number. For example, n ranges from 2 to 20.

The water-repellent film may be bound to the particle by a covalent bond. The following chemical formula (I) represents a favorable water-repellent film.

[Formula 1]

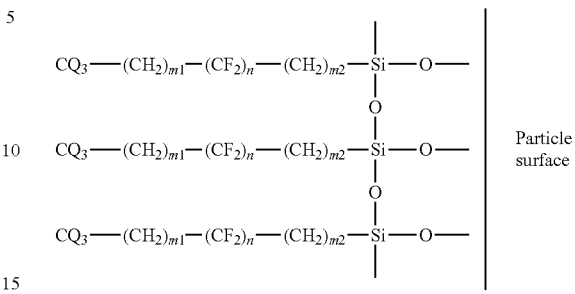

(I)

Here, Q is hydrogen or fluorine, and m1 and m2 represent zero or a natural number of at least one, independently. Further, n ranges from 2 to 20.

In the following, an exemplary method for producing the water-repellent particles will be described.

First, a surfactant represented by the chemical formula $CX_3-(CH_2)_{m1}-(CF_2)_n-(CH_2)_{m2}-SiX_3$ is dissolved in a non-aqueous solvent to prepare a surfactant solution. X is halogen, optionally, chlorine.

Next, a plurality of particles are immersed in the surfactant solution in dry atmosphere to obtain a plurality of water-repellent particles (see Patent Literature: U.S. Pat. No. 5,270,080 (corresponding to Japanese Examined Patent Application Publication No. 07-063670)).

Furthermore, examples of the material for the water-repellent film include chlorosilane materials or alkoxysilane materials. The chlorosilane materials are, for example, heptadecafluoro-1,1,2,2-tetrahydrodecyltrichlorosilane or n-octadecyldimethylchlorosilane. The alkoxysilane materials are, for example, n-octadecyltrimethoxysilane or nonafluorohexyltriethoxysilane.

The water-repellent particle layer 13 may have low thermal conductivity so that heat conduction between the water tank 11 and the liquefying layer 14 is reduced. In the water tank 11, the liquid is heated and evaporated. Accordingly, the water tank 11 is kept at a predetermined temperature or higher (for example, from 40° C. to 80° C.). The liquefying layer 14 liquefies the water vapor. Accordingly, the liquefying layer 14 is kept at a predetermined temperature or lower (for example, 40° C. or lower). The difference in temperature between the water tank 11 and the liquefying layer 14 is at least 10° C. When the difference in temperature between the water tank 11 and the liquefying layer 14 is considerable and the thermal conductivity therebetween is high, the desalination efficiency may be reduced in some cases.

Since the water-repellent particle layer 13 is formed of the plurality of water-repellent particles that are clustered together, air is present between the plurality of particles. Thus, the water-repellent particle layer 13 has lower thermal conductivity than a film or the like formed of a uniform material.

The thickness of the water-repellent particle layer 13 is, for example, from 5 mm to 30 cm.

When the water-repellent particle layer 13 is too thin (e.g., has a thickness of less than 5 mm), there is a possibility that the water poured in the water tank 11 may fall down to the liquefying layer 14. On the other hand, the water-repellent particle layer 13 is too thick (e.g., has a thickness of greater than 30 cm), the water vapor described later cannot easily pass through the gap between particles in the water-repellent particle layer 13.

<Liquefying Layer 14>

The liquefying layer 14 is located below the water-repellent particle layer 13. The liquefying layer 14 may be formed of a plurality of particles including particles that have not been treated to be water repellent. Alternatively, the liquefying layer 14 may be a space surrounded by the lower side wall 12b and the base plate 12c.

The lateral portion of the liquefying layer 14 may be entirely surrounded by the lower side wall 12b and the bottom portion thereof may be covered with the base plate 12c, so that the vessel 12 can hold fresh water 16.

The water vapor that has left the water-repellent particle layer 13 and reached the liquefying layer 14 after passing through the gap between the particles in the water-repellent particle layer 13 is liquefied in the liquefying layer 14 to become liquid water (fresh water 16). Details will be described later.

The liquefying layer 14 is cooled as necessary.

An exemplary cooling method is illustrated as follows. The liquefying layer 14 is cooled by placing at least a part of the liquefying layer 14 in the soil (in the ground). For example, the height of the interface between the liquefying layer 14 and the water-repellent particle layer 13 is brought to the same level as the earth's surface, thereby making the temperature of the liquefying layer 14 lower than that of the water-repellent particle layer 13.

Also, the liquefying layer 14 may include a cooling unit.

As described above, the liquefying layer 14 is located below the water-repellent particle layer 13, and liquefies by cooling the water vapor that has passed through the water-repellent particle layer 13. Here, the liquefying layer 14 is kept at a predetermined temperature or lower (for example, 15° C. or lower).

It should be noted that, at the interface between the liquefying layer 14 and the water-repellent particle layer 13, the desalination apparatus 10 may include a support layer such as a mesh, for example, for avoiding easy falling of the water-repellent particles in the water-repellent particle layer down to the liquefying layer 14.

[Desalination System with Basic Configuration]

The desalination apparatus 10 configured as above can be implemented not only as a device but also as a system. Hereinafter, an example of the desalination system with a basic configuration will be described with reference to FIG. 2.

Figure 2:
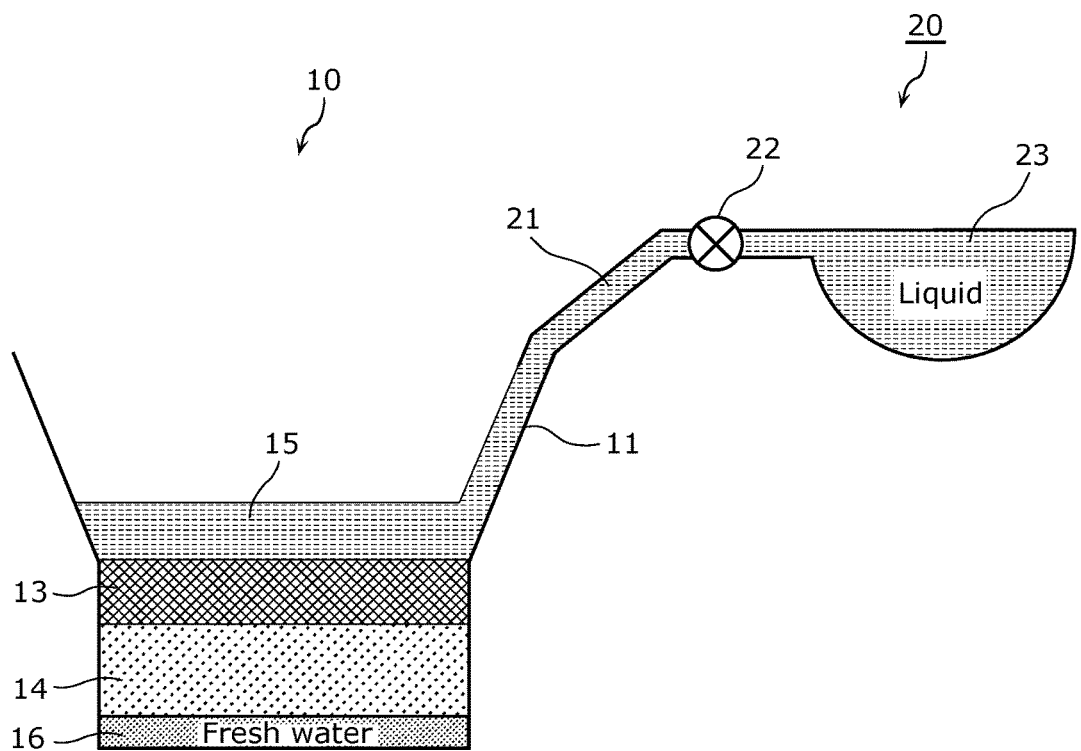
FIG. 2 is a sectional view illustrating an exemplary configuration of a desalination system with a basic configuration.

FIG. 2 is a sectional view illustrating an exemplary configuration of the desalination system with the basic configuration.

A desalination system 20 shown in FIG. 2 is, for example, a system that obtains fresh water from seawater, and includes the desalination apparatus 10 described above and a sluice gate 22. Structural elements similar to those in FIG. 1 are assigned the same reference signs, and the detailed description thereof will be omitted.

The sluice gate 22 is opened and closed so that the introduction of the liquid from the outside of the desalination apparatus 10 to the water tank 11 is started and stopped, respectively. More specifically, the sluice gate 22 is provided in an introduction passage 21, and regulates the amount of the liquid to be introduced to the water tank 11 (the introduction amount) via the introduction passage 21.

In an example illustrated by FIG. 2, the sluice gate 22 regulates the amount of flow of the liquid between the water tank 11 and an external tank 23 in which the liquid is stored.

When the sluice gate 22 is opened, the liquid is introduced from the external tank 23 via the introduction passage 21 to the water tank 11. When the sluice gate 22 is closed, the introduction of the liquid from the external tank 23 via the introduction passage 21 to the water tank 11 is stopped. It should be noted that the opening and closing of the sluice gate 22 may be, for example, operated by a user or the like or, for example, controlled by a control device or the like.

The external tank 23 is, for example, the sea, a pretreatment tank that stores seawater introduced from the sea, or a tank that stores salt water supplied separately.

In the desalination system 20 configured as above, the sluice gate 22 is provided, thereby regulating the flow of water.

[Desalination Method]

The following description will be directed to a desalination process carried out by the desalination apparatus 10 or the desalination system 20 with the basic configuration described above.

<Desalination Process>

Figure 3:
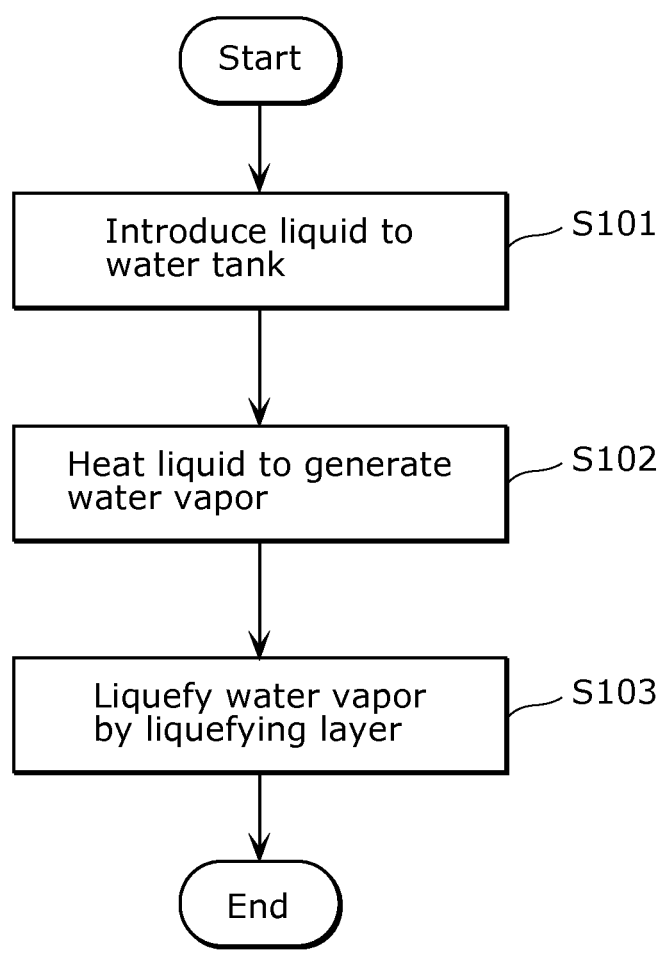
FIG. 3 is a flowchart illustrating steps of a desalination process of the desalination apparatus with the basic configuration.

FIG. 3 is a flowchart illustrating steps of the desalination process of the desalination apparatus 10.

First, the liquid is introduced to the water tank 11, and placed above the water-repellent particle layer 13 (to serve as the liquid layer 15) (S101). Here, the liquid is, for example, salt water.

Incidentally, when the desalination process is carried out in the desalination system 20 shown in FIG. 2, the liquid is poured from the external tank 23 via the sluice gate 22 and the introduction passage 21 into the water tank 11, thus forming the liquid layer 15 on the upper surface of the water-repellent particle layer 13.

Next, by heating and evaporating the liquid placed above the water-repellent particle layer 13, the water vapor is generated (S102). More specifically, when the liquid stored in the water tank 11 (the liquid layer 15) is heated to a temperature higher than or equal to a certain temperature, the liquid turns to the water vapor.

Incidentally, the above-noted certain temperature is determined according to a saturation vapor pressure curve based on the kind of the liquid and atmospheric pressure. For example, when the liquid is salt water, the certain temperature is from 50° C. to 60° C. The liquid layer 15 may be heated, for example, by sunlight or by a heater if the water tank 11 includes the heater. Alternatively, the liquid layer 15 may be heated by supplying a heated object into the liquid layer 15 in the water tank 11.

Subsequently, the water vapor is liquefied by the liquefying layer 14, thereby obtaining the fresh water (S103).

More specifically, the water vapor obtained by heating and evaporating the liquid in the water tank 11 moves not only upward but also downward. When the water vapor moving downward passes through the gap between the water-repellent particles in the water-repellent particle layer 13 and reaches the liquefying layer 14, it is liquefied by the liquefying layer 14 to become liquid water. In other words, the water vapor obtained by heating and evaporating the liquid in the water tank 11 is cooled in the liquefying layer 14 to become liquid water.

In this manner, the desalination process of the desalination apparatus 10 (or the desalination system 20) is performed.

It should be noted that the liquid water is water in which solids contained in the liquid that has been poured into the water tank 11 and impurities dissolved therein are reduced, and typically fresh water (distilled water). The impurities dissolved in the liquid are, for example, ions.

(Knowledge Leading to the Present Disclosure)

However, in the desalination apparatus 10 and the desalination system 20 with the basic configuration described above, the impurities in the liquid are deposited as time passes, namely, as the liquid in which the impurities such as salt are mixed or dissolved is evaporated. These deposited impurities cause the reduction of desalination efficiency. More specifically, in the case where the liquid in the water tank 11 is, for example, seawater, the salinity of the seawater (the seawater concentration above the water-repellent particle layer 13) rises as the seawater is evaporated. When saturation salinity is reached, salt is deposited on the water-repellent particle layer 13, thus reducing the desalination efficiency.

Thus, if the desalination efficiency is to be maintained in the desalination apparatus 10, it is necessary to always keep the impurity concentration lower than the saturation concentration.

Accordingly, in order to suppress the reduction in the desalination efficiency, the inventors have arrived at an invention capable of always keeping the impurity concentration lower than the saturation concentration.

In the following, a desalination apparatus 10A and a desalination system 20A in the present embodiment capable of always keeping the impurity concentration lower than the saturation concentration will be described.

[Desalination System]

Figure 4:
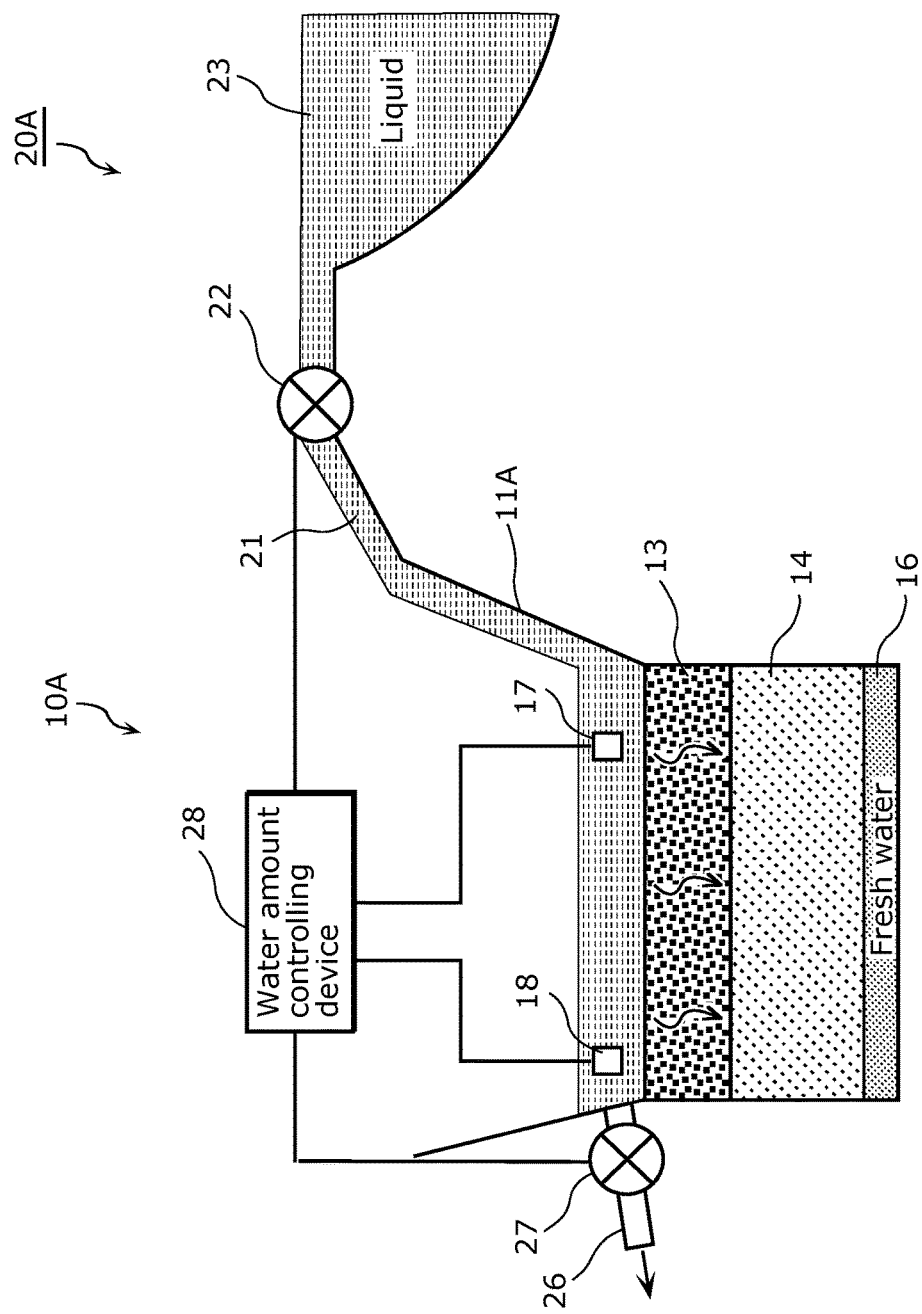
FIG. 4 is a sectional view illustrating an exemplary configuration of a desalination system in an embodiment.
Figure 5A:
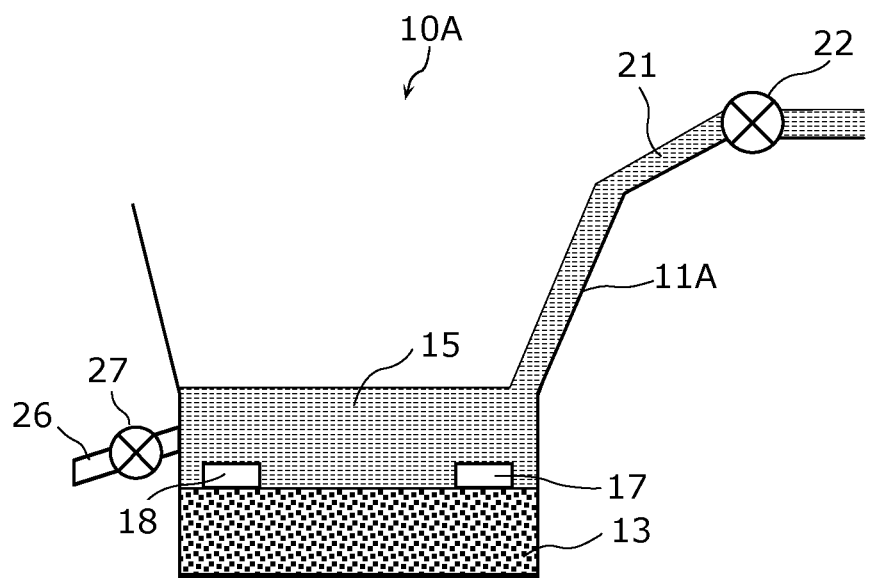
FIG. 5A is a sectional view illustrating exemplary installation positions of sensors in an embodiment.
Figure 5B:
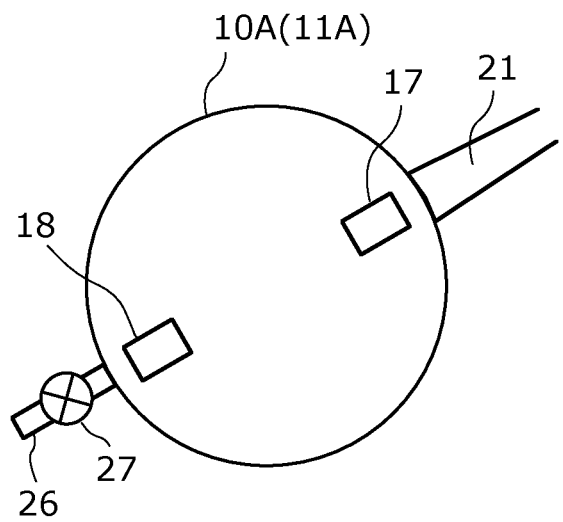
FIG. 5B is a top view illustrating the exemplary installation positions of the sensors in an embodiment.

FIG. 4 is a sectional view illustrating an exemplary configuration of the desalination system in the present embodiment. FIG. 5A is a sectional view illustrating exemplary installation positions of sensors, and FIG. 5B is a top view illustrating the exemplary installation positions of the sensors. Structural elements similar to those in FIGS. 1 and 2 are assigned the same reference signs, and the detailed description thereof will be omitted.

The desalination system 20A shown in FIG. 4 includes the desalination apparatus 10A that obtains the fresh water from the liquid, a temperature sensor 17, a concentration sensor 18, a discharge valve 27, and a water amount controlling device 28.

In the present embodiment, the desalination system 20A further includes the introduction passage 21, the sluice gate 22, the external tank 23, and a discharge passage 26.

The desalination apparatus 10A includes a water tank 11A, the water-repellent particle layer 13 and the liquefying layer 14, and obtains the fresh water from the liquid. The desalination apparatus 10A is connected to the introduction passage 21 for supplying the liquid to the desalination apparatus 10A. The introduction passage 21 is a passage for introducing the liquid from the external tank 23.

<Water Tank 11A>

As in the basic configuration described above, a lateral surface of the water tank 11A is formed of the upper side wall 12a, and a bottom surface thereof is formed of an upper surface of the water-repellent particle layer 13. The water tank 11A has a space that is surrounded by the upper side wall 12a and the water-repellent particle layer 13 and stores the liquid. A part of the lateral surface of the water tank 11A is connected with the introduction passage 21. Alternatively, a part of an upper end of the upper side wall 12a may be connected with the introduction passage 21.

The water tank 11A has the lateral surface provided with the discharge passage 26 through which the liquid is discharged. The discharge passage 26 may be disposed at a position opposed to the position of the introduction passage 21 in the lateral surface of the water tank 11A. In other words, the discharge passage 26 is disposed at the position opposed to the introduction passage 21, with the space in the water tank 11A for storing the liquid interposed therebetween.

This allows the liquid in the water tank 11A to flow gradually inside the water tank 11A and be discharged from the discharge passage 26. Here, the discharge passage 26 may be a liquid port of the water tank 11A or may have any mode as long as a part of the liquid in the water tank 11A gradually flows and is discharged. Incidentally, since other matters are similar to those described in the basic configuration, the detailed description thereof will be omitted.

<Water-Repellent Particle Layer 13>

The water-repellent particle layer 13 is located below the water tank 11A, and formed of a plurality of water-repellent particles. When the liquid contained in the water tank 11A has a height smaller than or equal to a predetermined height, the liquid cannot pass through the water-repellent particle layer 13. On the other hand, the water vapor generated by evaporating the liquid in the water tank 11A passes through the water-repellent particle layer 13. Since details are similar to those described in the basic configuration, the description thereof will be omitted.

<Liquefying Layer 14>

The liquefying layer 14 is located below the water-repellent particle layer 13. The liquefying layer 14 obtains the fresh water by liquefying the water vapor that has passed through the water-repellent particle layer 13. Since details are similar to those described in the basic configuration, the description thereof will be omitted.

<Temperature Sensor 17>

The temperature sensor 17 is located in the water tank 11A, and measures the temperature of the liquid stored in the water tank 11A. For example, the temperature sensor 17 is located at a position above the water-repellent particle layer 13 and at a bottom of the water tank 11A, as shown in FIG. 5A. This makes it possible to measure the temperature of the liquid (the liquid layer 15) near the interface between the water-repellent particle layer 13 and the water tank 11A. By using the above-described measurement result of the temperature sensor 17, the water amount controlling device 28 described later can keep the temperature of the liquid (the liquid layer 15) near the interface between the water-repellent particle layer 13 and the water tank 11A higher than or equal to a predetermined temperature, so that the extension of time needed for evaporating the liquid can be suppressed. This helps to further suppress the reduction in the amount of water vapor passing through the water-repellent particle layer 13.

Also, as shown in FIGS. 5A and 5B, the temperature sensor 17 is located in the water tank 11A at a position closer to where the liquid is introduced from the sluice gate 22 than to a position of the discharge valve 27. This makes it possible to measure the temperature of the liquid at the above-noted position, which is likely to be lowest within the water tank 11A. By using the above-described measurement result of the temperature sensor 17, the water amount controlling device 28 described later can keep the temperature of the entire liquid in the water tank higher than or equal to a predetermined temperature, so that the extension of time needed for evaporating the liquid can be suppressed. This helps to suppress the reduction in the desalination efficiency.

<Concentration Sensor 18>

The concentration sensor 18 is located in the water tank 11A, and measures the concentration of the liquid stored in the water tank 11A. For example, the concentration sensor 18 is located at a position above the water-repellent particle layer 13 and at a bottom of the water tank 11A, as shown in FIG. 5A. This allows the concentration sensor 18 to measure the concentration of the liquid (the liquid layer 15) near the interface between the water-repellent particle layer 13 and the water tank 11A. By using the measurement result of the concentration sensor 18, the water amount controlling device 28 described later can keep the concentration of the liquid (the liquid layer 15) near the interface between the water-repellent particle layer 13 and the water tank 11A lower than a saturation concentration. This helps to further suppress the reduction in the amount of water vapor passing through the water-repellent particle layer 13.

Also, as shown in FIGS. 5A and 5B, the concentration sensor 18 is located in the water tank 11A at a position closer to the position of the discharge valve 27 than to where the liquid is introduced from the sluice gate 22 to the water tank 11A. It is favorable that the concentration sensor 18 be located in the water tank 11A at a position closest to the position of the discharge valve 27. This makes it possible to measure the impurity concentration of the liquid near the discharge valve, which is likely to be highest within the water tank 11A. By using the above-described measurement result of the concentration sensor 18, the water amount controlling device 28 described later can always keep the impurity concentration of the entire liquid in the water tank 11A lower than a saturation concentration, so that the reduction in the desalination efficiency can be suppressed.

Although the temperature sensor 17 and the concentration sensor 18 have been described as separate sensors in the present embodiment, there is no particular limitation to this. The temperature sensor 17 and the concentration sensor 18 may be configured as a single sensor having a temperature sensor function and a concentration sensor function. In that case, the sensor measuring the temperature and the impurity concentration of the liquid stored in the water tank 11A is at least located at a position above the water-repellent particle layer 13 and at the bottom of the water tank 11A.

<Introduction Passage 21>

The introduction passage 21 is connected between the external tank 23 and the water tank 11A, and directs the liquid in the external tank 23 to the water tank 11A.

In order to direct the liquid from the external tank 23 to the water tank 11A, the introduction passage 21 may be downwardly inclined along a direction from the external tank 23 (more specifically, the sluice gate 22) to the water tank 11A. In other words, the introduction passage 21 may be formed such that a connection portion of the introduction passage 21 and the external tank 23 (the sluice gate 22) is located at a higher position relative to a connection portion of the introduction passage 21 and the water tank 11A. The introduction passage 21 is downwardly inclined, whereby the liquid flows downwardly in FIG. 4.

In the case of introducing the liquid at an amount greater than or equal to a predetermined amount to the introduction passage 21 so as to direct the liquid to the water tank 11A, the introduction passage 21 does not have to be inclined.

<Sluice Gate 22>

The sluice gate 22 is opened and closed so that the introduction of the liquid from the outside of the desalination apparatus 10A (here, the external tank 23) to the water tank 11A is started and stopped, respectively. More specifically, the sluice gate 22 is provided in the introduction passage 21, and regulates the amount of the liquid to be introduced to the water tank 11A (the introduction amount) via the introduction passage 21.

Similarly to the description of FIG. 2, the sluice gate 22 regulates the amount of the liquid flowing between the water tank 11A and the external tank 23 storing the liquid. The opening and closing of the sluice gate 22 are controlled by the water amount controlling device 28 described later. It is noted that the sluice gate 22 is opened and closed also by, for example, a user or the like other than the water amount controlling device 28. Since other details are similar to those described in the basic configuration, the description thereof will be omitted.

<Discharge Passage 26>

The discharge passage 26 is connected to the water tank 11A, and discharges the liquid stored in the water tank 11A to an outside.

In order to discharge the liquid from the water tank 11A to the outside, the discharge passage 26 may be downwardly inclined along a direction from the water tank 11A to the outside. In other words, the discharge passage 26 may be formed such that a connection portion of the discharge passage 26 and the water tank 11A is located at a higher position relative to a connection portion of the discharge passage 26 and the outside. The discharge passage 26 is downwardly inclined, whereby the liquid flows downwardly in FIG. 4.

In the case of introducing the liquid in the water tank 11A at an amount greater than or equal to a predetermined amount to the discharge passage 26 so as to direct the liquid to the outside, the discharge passage 26 does not have to be inclined.

<Discharge Valve 27>

The discharge valve 27 is opened and closed so that the discharge of the liquid from the water tank 11A to the outside is started and stopped, respectively. More specifically, the discharge valve 27 is disposed in the discharge passage 26, and regulates the amount of the liquid to be discharged (the discharge amount) via the discharge passage 26 to the outside.

The discharge valve 27 regulates the flow amount of the liquid to be discharged from the water tank 11A to the outside. The opening and closing of the discharge valve 27 are controlled by the water amount controlling device 28 described later.

<Water Amount Controlling Device 28>

The water amount controlling device 28 is an example of a control unit, and controls the amount of the liquid to be introduced to or discharged from the water tank 11A based on the measurement results of the sensors (the temperature sensor 17 and the concentration sensor 18).

Figure 6:
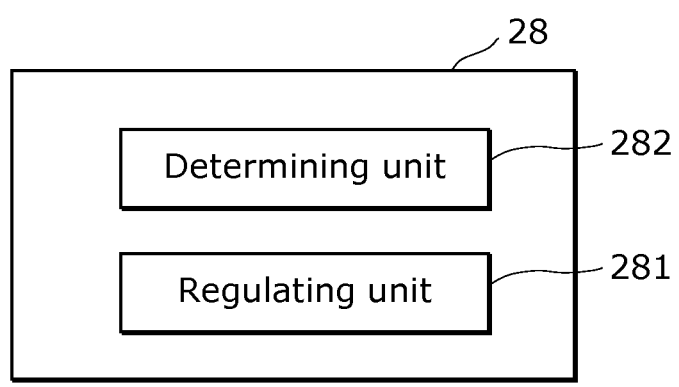
FIG. 6 illustrates an exemplary configuration of a water amount controlling device in an embodiment.

FIG. 6 illustrates an exemplary configuration of the water amount controlling device in an embodiment.

As shown in FIG. 6, the water amount controlling device 28 includes a regulating unit 281 and a determining unit 282.

The determining unit 282 constantly monitors the measurement results of the temperature sensor 17 and the concentration sensor 18, and determines whether the impurity concentration measured by the concentration sensor 18 is higher than or equal to a first reference value, which is lower than the saturation concentration, higher than or equal to a second reference value, which is lower than the first reference value, or lower than the second reference value. Furthermore, the determining unit 282 determines whether the temperature measured by the temperature sensor 17 is lower than or equal to a third reference value.

The regulating unit 281 regulates the opening/closing and throttling (the degree of openness) of the discharge valve 27 and the sluice gate 22. More specifically, the regulating unit 281 opens the discharge valve 27 when the impurity concentration measured by the concentration sensor 18 is higher than or equal to the first reference value, and opens the sluice gate 22 for introducing the liquid to the water tank 11A a predetermined period after opening the discharge valve 27. Furthermore, the regulating unit 281 throttles the discharge valve 27 and the sluice gate 22 when the impurity concentration measured by the concentration sensor 18 is higher than or equal to the second reference value, which is lower than the first reference value, and the temperature measured by the temperature sensor 17 is lower than or equal to the third reference value. Moreover, the regulating unit 281 closes the discharge valve 27 when impurity concentration measured by the concentration sensor 18 is lower than the second reference value, and closes the sluice gate 22 a predetermined period after closing the discharge valve 27.

It should be noted that the water amount controlling device 28 may control the opening and closing of the sluice gate 22 and the discharge valve 27 according to information inputted from a user or the like using an input unit (not shown) in addition to the measurement results of the sensors (the temperature sensor 17 and the concentration sensor 18). Here, the input unit is, for example, a touch panel, a keyboard, a cursor, a microphone or the like. Also, the information to be inputted to the input unit by the user or the like is, for example, information indicating an instruction to open the sluice gate 22 or information indicating an instruction to close the sluice gate 22.

Figure 7:
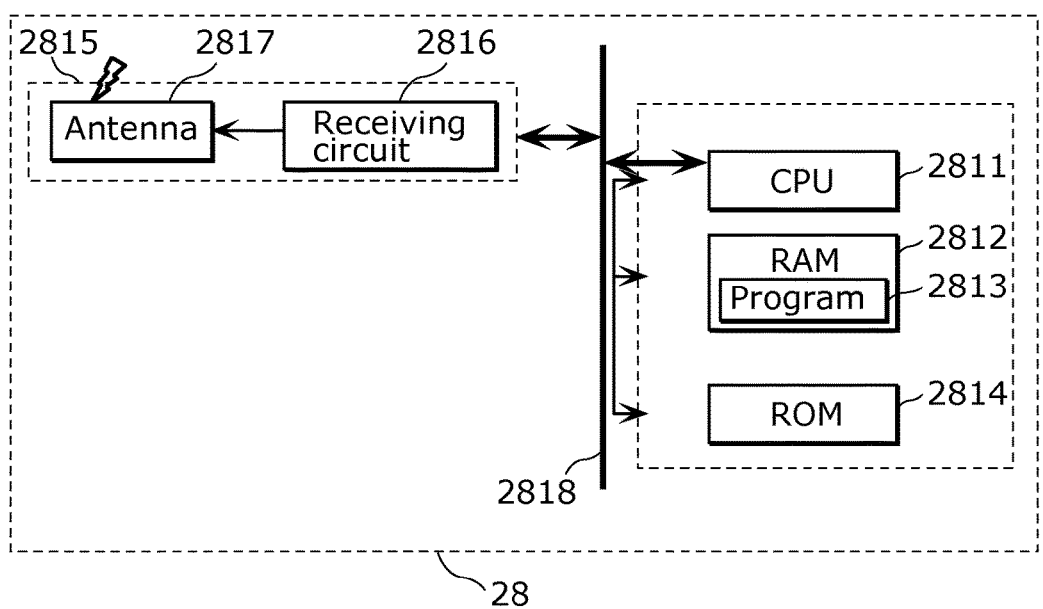
FIG. 7 is a block diagram illustrating an exemplary hardware configuration of the water amount controlling device in an embodiment.

FIG. 7 is a block diagram illustrating an exemplary hardware configuration of the water amount controlling device 28 in the present embodiment.

As shown in FIG. 7, the water amount controlling device 28 includes, for example, a CPU 2811, a RAM 2812, a ROM 2814, a receiving unit 2815 and a bus 2818.

The CPU 2811 executes a program 2813 stored in the RAM 2812. In the program 2813, procedures in FIG. 8 explained later are described, for example. It is noted that the program 2813 may be stored in the ROM 2814.

The receiving unit 2815 includes an antenna 2817 and a receiving circuit 2816, and receives information indicating opening/closing of the sluice gate, etc. For example, when the user or the like inputs the information to the input unit, the information is transmitted from the antenna provided in the input unit. In that case, in the water amount controlling device 28, the transmitted information is received by the antenna 2817 and accepted by the receiving circuit 2816.

The receiving circuit 2816 and the CPU 2811 are connected to each other via the bus 2818, and can mutually transfer data. The information accepted by the receiving unit 2815, namely, the receiving circuit 2816 is transmitted to the CPU 2811 via the bus 2818.

[Water Amount Controlling Method]

In the following, referring to FIGS. 8 and 9, the water amount controlling process of the desalination system 20A configured as above will be described.

Figure 8:
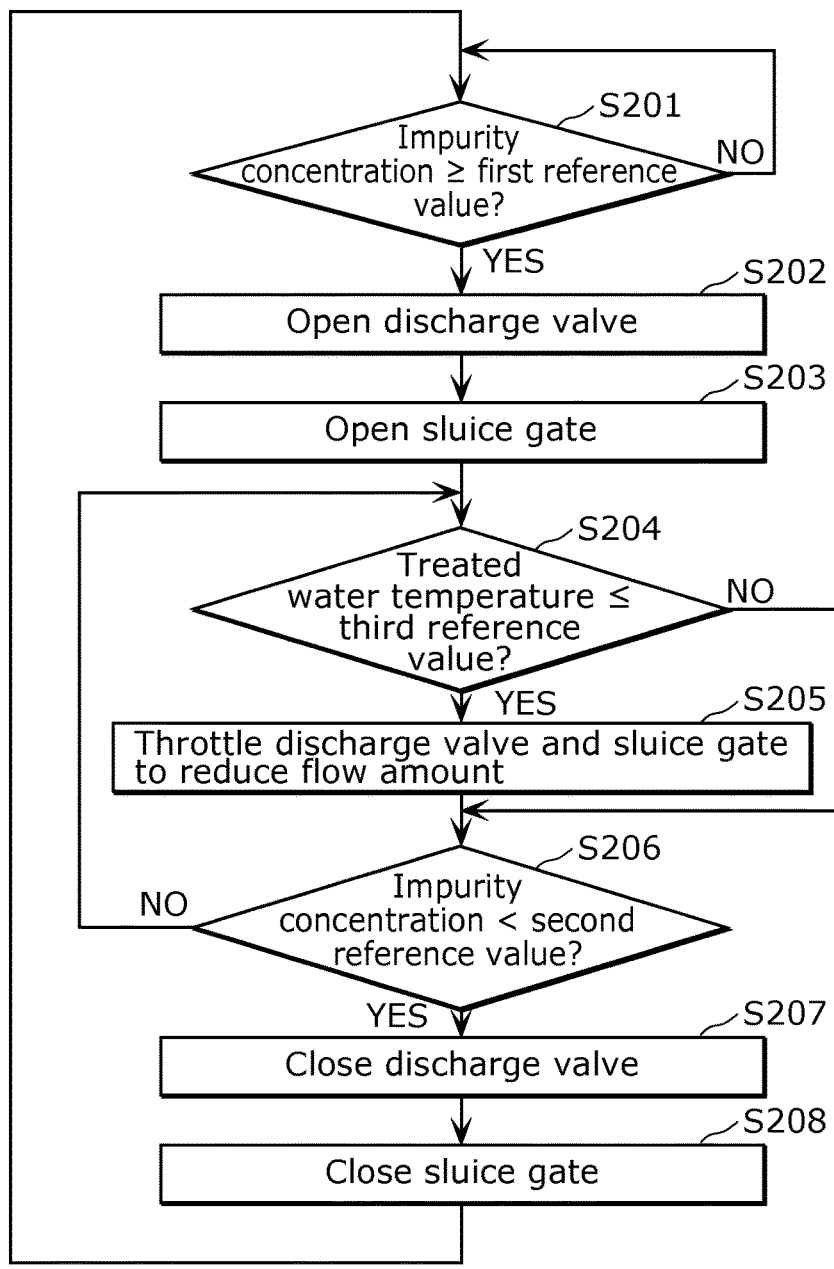
FIG. 8 is a flowchart illustrating steps of a water amount controlling process for a desalination system in an embodiment.

FIG. 8 is a flowchart illustrating steps of the water amount controlling process for the desalination system in an embodiment. The water amount controlling device 28 constantly monitors the measurement results of the temperature sensor 17 and the concentration sensor 18.

First, the water amount controlling device 28 determines whether the impurity concentration measured by the concentration sensor 18 is higher than or equal to the first reference value, which is lower than the saturation concentration (S201).

The water amount controlling device 28 opens the discharge valve 27 (S202) if the impurity concentration measured by the concentration sensor 18 is higher than or equal to the first reference value (YES in S201), and opens the sluice gate 22 for introducing the liquid to the water tank 11A (S203) a predetermined period after opening the discharge valve 27. Incidentally, if the impurity concentration measured by the concentration sensor 18 is not higher than or equal to the first reference value (NO in S201), the water amount controlling device 28 returns to S201 and carries out the process of S201 again.

Next, the water amount controlling device 28 determines whether the temperature measured by the temperature sensor 17 is lower than or equal to the third reference value (S204). More specifically, the water amount controlling device 28 determines whether the impurity concentration measured by the concentration sensor 18 is higher than or equal to the second reference value, which is lower than the first reference value, and the temperature measured by the temperature sensor 17 is lower than or equal to the third reference value. Incidentally, if the temperature measured by the temperature sensor 17 is higher than the third reference value in S204 (NO in S204), the water amount controlling device 28 proceeds to the process of S206.

If the temperature measured by the temperature sensor 17 is lower than or equal to the third reference value (YES in S204), the water amount controlling device 28 throttles the discharge valve 27 and the sluice gate 22, thus reducing the discharge flow amount and the introduction flow amount (S205). More specifically, the water amount controlling device 28 throttles the discharge valve 27 and the sluice gate 22 if the impurity concentration measured by the concentration sensor 18 is higher than or equal to the second reference value, which is lower than the first reference value, and the temperature measured by the temperature sensor 17 is lower than or equal to the third reference value.

Subsequently, the water amount controlling device 28 determines whether the impurity concentration measured by the concentration sensor 18 is lower than the second reference value (S206).

If the impurity concentration measured by the concentration sensor 18 is lower than the second reference value (YES in S206), the water amount controlling device 28 closes the discharge valve 27 (S207), and closes the sluice gate 22 a predetermined period after closing the discharge valve 27 (S208).

Incidentally, returning to S201 if the impurity concentration measured by the concentration sensor 18 is not lower than the second reference value in S206 (NO in S206), the water amount controlling device 28 carries out the processes starting from S201 again.

Figure 9:
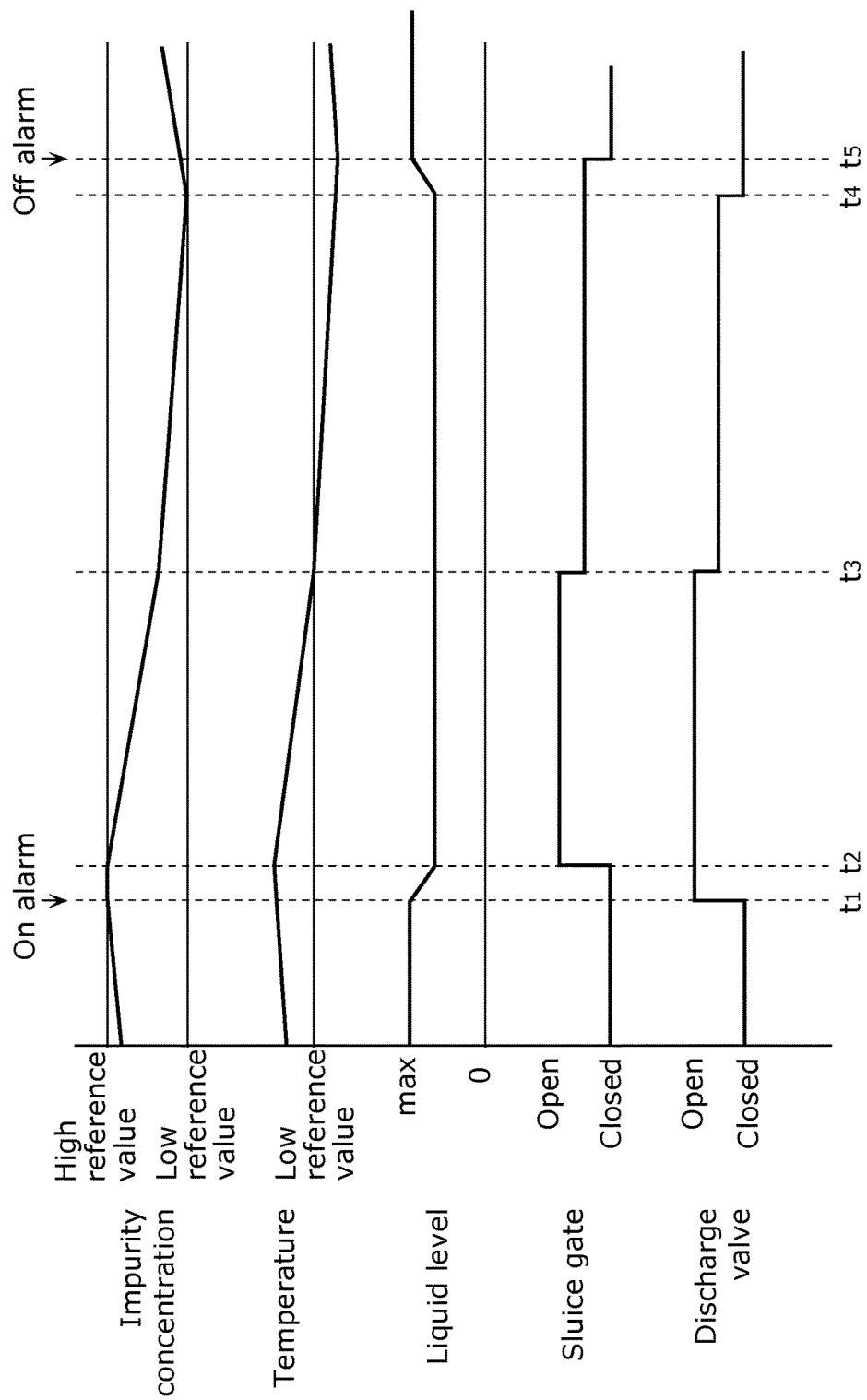
FIG. 9 is a sequence diagram illustrating the water amount controlling process for the desalination system in an embodiment.

FIG. 9 illustrates variations in the impurity concentration, the liquid temperature, etc. during the water amount controlling process for the desalination system in an embodiment.

The flow described in FIG. 8 will be elaborated with reference to an example illustrated in FIG. 9.

First, since the sluice gate 22 and the discharge valve 27 are closed before time t1, the impurity concentration of the liquid in the water tank 11A rises gradually and the temperature of the liquid also rises gradually. The liquid level is substantially constant because the liquid is neither introduced nor discharged except for evaporation of the liquid.

Next, at time t1, the water amount controlling device 28 first opens the discharge valve 27 (S202) if it determines that the impurity concentration measured by the concentration sensor 18 is higher than or equal to the first reference value (YES in S201). At this time, the temperature of the liquid tends to increase further because the sluice gate 22 is closed and no low-temperature liquid is newly introduced. Also, the liquid level tends to decrease because the discharge from the discharge valve 27 is started. The impurity concentration of the liquid in the water tank 11A does not vary because no liquid is newly introduced although the liquid in the water tank 11A is discharged.

Subsequently, at time t2 after a lapse of a predetermined period, the water amount controlling device 28 opens the sluice gate 22 for introducing the liquid to the water tank 11A (S203).

At this time, the temperature of the liquid tends to decrease because the sluice gate 22 is opened and the introduction of a new low-temperature liquid (the liquid in the external tank 23) is started. Furthermore, the liquid level tends to be maintained at the level at time t2 because the liquid is discharged from the discharge valve 27 and introduced from the sluice gate 22. The impurity concentration of the liquid in the water tank 11A tends to decrease because the liquid in the water tank 11A is discharged and the sluice gate 22 is open so as to newly introduce the liquid.

It is noted that the sluice gate 22 is opened a predetermined period after opening the discharge valve 27 in order to discharge the liquid having a high concentration from the water tank 11 at an early stage, thus shortening the time needed for replacing the liquid.

Next, at time t3, if the water amount controlling device 28 determines that the temperature measured by the temperature sensor 17 is lower than or equal to the third reference value (YES in S204), it throttles the discharge valve 27 and the sluice gate 22 simultaneously so as to reduce the discharge flow amount and the introduction flow amount (S205).

At this time, the temperature of the liquid tends to decrease because the sluice gate 22 is open so as to continue to newly introduce the low-temperature liquid (the liquid in the external tank 23). However, since the sluice gate 22 is throttled, the gradient of temperature decrease becomes gentle. This is to keep the temperature of the liquid in the water tank 11A higher than or equal to a predetermined temperature. Additionally, the liquid level tends to be maintained at the level at time t2 because the discharge amount of the discharge valve 27 and the liquid introduction amount of the sluice gate 22 are maintained. Although the sluice gate 22 and the discharge valve are throttled, the liquid in the water tank 11A is discharged and the liquid is newly introduced via the sluice gate 22. Thus, the impurity concentration of the liquid in the water tank 11A tends to decrease even after time t3, though its gradient becomes more gentle than that from time t2 to time t3.

Next, at time t3, if the water amount controlling device 28 determines that the temperature measured by the temperature sensor 17 is lower than or equal to the third reference value (YES in S204), it throttles the discharge valve 27 and the sluice gate simultaneously so as to reduce the discharge flow amount and the introduction flow amount (S205).

Then, at time t4, the water amount controlling device 28 first closes the discharge valve 27 (S207) if the impurity concentration measured by the concentration sensor 18 is lower than the second reference value (YES in S206).

At this time, the temperature of the liquid tends to decrease further because, although the discharge valve 27 is closed, the sluice gate 22 is open so as to newly introduce the liquid. Also, the liquid level tends to increase because the discharge from the discharge valve 27 is stopped. The impurity concentration of the liquid in the water tank 11A tends to decrease further because, although the discharge of the liquid from the water tank 11A is stopped, the liquid is newly introduced.

Subsequently, at time t5 after a lapse of a predetermined period, the water amount controlling device 28 closes the sluice gate 22 (S208).

At this time, the temperature of the liquid tends to increase because the sluice gate 22 is also closed, allowing no introduction of the liquid. Furthermore, the liquid level tends to be maintained at the level at time t5 because the discharge from the discharge valve 27 is stopped and the introduction of the liquid via the sluice gate 22 is stopped. The impurity concentration of the liquid in the water tank 11A tends to increase gradually because the discharge valve 27 and the sluice gate 22 are closed.

It is noted that the sluice gate 22 is closed a predetermined period after closing the discharge valve 27 in order to supplement a portion of the liquid in the water tank 11A lost because the discharge valve 27 is first opened from time t1 to time t2.

Incidentally, if the discharge amount and the introduction amount are the same, the period from time t1 to time t2 and the period from time t4 to time t5 are the same. On the other hand, if they are different, the difference in time period may be adjusted so as to supplement the lost portion of the liquid in the water tank 11A.

Additionally, an on alarm may be sounded when the discharge valve 27 is opened at time t1, or an off alarm may be sounded when the sluice gate 22 is closed at time t5. This makes it possible to notify the user of the desalination system 20A of when to regulate the concentration of the liquid in the water tank 11A.

As described above, with the water amount controlling method and the desalination system according to one aspect of the present disclosure, it becomes possible to always keep the impurity concentration lower than the saturation concentration and keep the temperature of the liquid higher than or equal to a predetermined temperature. Thus, the reduction of the amount of the water vapor passing through the water-repellent particle layer can be suppressed, and the extension of time needed for evaporating the liquid can be suppressed. This helps to suppress the reduction in the desalination efficiency.

It should be noted that the desalination system is not limited to the example illustrated in FIG. 4. The following description will be directed to another example of the desalination system.

Figure 10:
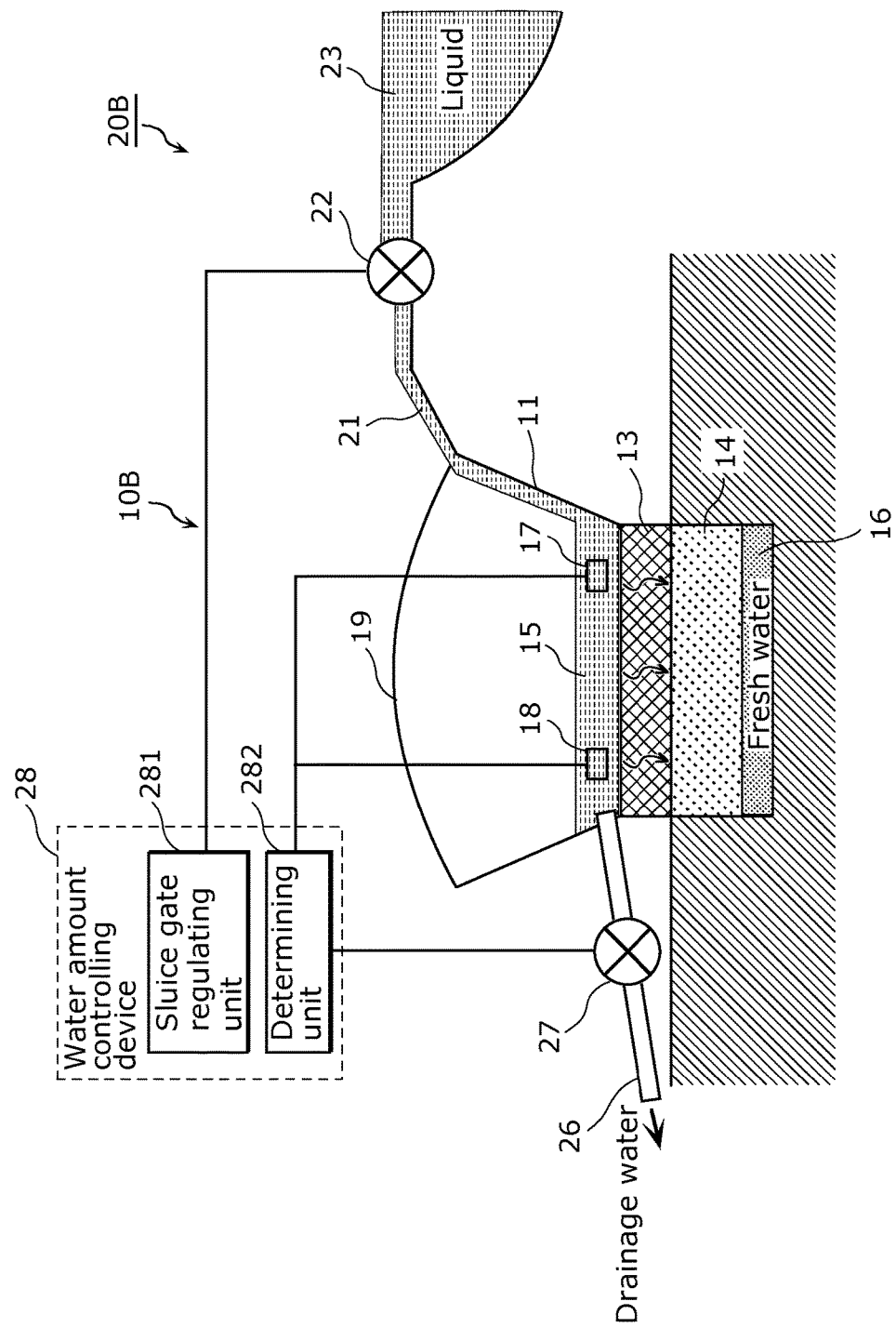
FIG. 10 illustrates another exemplary configuration of the desalination system in an embodiment.

FIG. 10 is a sectional view illustrating another example of the desalination system in the present embodiment. Structural elements similar to those in FIG. 4 are assigned the same reference signs, and the detailed description thereof will be omitted.

A desalination system 20B shown in FIG. 10 includes a lid 19 unlike the desalination system 20A shown in FIG. 4. Since other configurations are similar to those of the desalination apparatus 10, the description thereof will be omitted.

The lid 19 is provided in the water tank 11A, and covers an opening of the water tank 11A (the upper side wall 12a). The lid 19 is formed of a transparent member when the liquid layer 15 of the desalination apparatus 10B is heated by sunlight. The desalination apparatus 10B includes the lid 19, whereby it is possible to not only reduce the water vapor upwardly escaping from the water tank 11A but also reduce the impurities entering through the opening of the water tank 11A.

It should be noted that a structure such as a film capable of passing the liquid or the water vapor therethrough may be disposed between the water tank 11A and the water-repellent particle layer 13. Moreover, a structure such as a film capable of passing the water vapor therethrough may be disposed between the water-repellent particle layer 13 and the liquefying layer 14.

Although the above description is mainly directed to an example of obtaining fresh water from salt water, there is no particular limitation to the salt water. For example, in the case of obtaining distilled water (fresh water) from drainage water or the like in which chemical substances are dissolved instead of the salt water, the chemical substances dissolved in the liquid can be reduced similarly. Consequently, the desalination apparatuses 10, 10A and 10B described above can remove impurities dissolved in the liquid.

Although the water amount controlling method and the desalination system according to one or more aspects of the present disclosure have been described above based on an embodiment, the present disclosure is by no means limited to this embodiment. As long as not departing from the purport of the present disclosure, many variations of the above embodiment conceivable by a person skilled in the art and modes configured by the combination of the structural components in different embodiments may be included in the scope of one or more aspects of the present disclosure.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing a desalination system according to each of the embodiments is a program described below.

The herein disclosed subject matter is to be considered descriptive and illustrative only, and the appended Claims are of a scope intended to cover and encompass not only the particular embodiment(s) disclosed, but also equivalent structures, methods, and/or uses.

INDUSTRIAL APPLICABILITY

A water amount controlling method and a desalination system according to one or more exemplary embodiments disclosed herein are applicable to a water amount controlling method and a desalination system that desalinate seawater or distill a liquid by removing impurities that may be deposited as salt.

The invention claimed is:

1. A water amount controlling method for a desalination system including:
   a water tank having a space for storing a liquid;
   a lid covering an opening of the water tank;
   a water-repellent particle layer that is located below the water tank and contains a plurality of water-repellent particles;
   a liquefying layer that is located below the water-repellent particle layer and liquefies water vapor that has passed through the water-repellent particle layer to obtain fresh water, the liquefying layer containing a plurality of particles that have not been treated to be water-repellant;
   a temperature sensor that measures a temperature of the liquid stored in the water tank;
   a concentration sensor that measures an impurity concentration of the liquid stored in the water tank; and
   a water amount controlling device having a processor, the water amount controlling device controlling an amount of the liquid to be introduced to or discharged from the water tank based on the temperature measured by the temperature sensor and the impurity concentration measured by the concentration sensor, the water amount controlling method comprising:
   opening a discharge valve that discharges the liquid from the water tank if the impurity concentration measured by the concentration sensor is higher than or equal to a first reference value, and opening a sluice gate that introduces the liquid to the water tank a predetermined period after opening the discharge valve, the first reference value being lower than a saturation concentration;
   after the water amount controlling device opens the discharge valve and the sluice gate, throttling the discharge valve to reduce a flow of the discharge of the liquid from the water tank and throttling the sluice gate to reduce a flow of introducing the liquid to the water tank, if the impurity concentration measured by the concentration sensor is higher than or equal to a second reference value and the temperature measured by the temperature sensor is lower than or equal to a third reference value, the second reference value being lower than the first reference value; and
   after the water amount controlling device throttles the discharge valve and the sluice gate, closing the discharge valve if the impurity concentration measured by the concentration sensor is lower than the second reference value, and closing the sluice gate a predetermined period after closing the discharge valve; the opening, the throttling and the closing being performed by the water amount controlling device.

2. The water amount controlling method according to claim 1,
   wherein the temperature sensor and the concentration sensor are located at a position above the water-repellent particle layer and at a bottom of the water tank.

3. The water amount controlling method according to claim 1,
   the concentration sensor is located in the water tank at a position closer to a position of the discharge valve than to where the liquid is introduced from the sluice gate to the water tank.

4. The water amount controlling method according to claim 3,
   wherein the temperature sensor is located in the water tank at a position closer to where the liquid is introduced from the sluice gate than to the position of the discharge valve.

5. The water amount controlling method according to claim 1, further comprising:
   heating and evaporating the liquid above the water-repellent particle layer to generate water vapor; and
   liquefying the water vapor in the liquefying layer to obtain the fresh water.

6. A desalination system comprising:
   a desalination apparatus including (i) a water tank having a space for storing a liquid, (ii) a lid covering an opening of the water tank, (iii) a water-repellent particle layer that is located below the water tank and contains a plurality of water-repellent particles, and (iv) a liquefying layer that is located below the water-repellent particle layer to obtain fresh water, the liquefying layer containing a plurality of particles that have not been treated to be water-repellant;
   a temperature sensor that measures a temperature of the liquid stored in the water tank;

a concentration sensor that measures an impurity concentration of the liquid stored in the water tank a discharge valve that discharges the liquid stored in the water tank; and a water amount controlling device having a processor, the water amount controlling device being configured to control an amount of the liquid to be introduced to or discharged from the water tank based on the temperature measured by the temperature sensor and the impurity concentration measured by the concentration sensor, wherein the water amount controlling device is configured to:

open the discharge valve if the impurity concentration measured by the concentration sensor is higher than or equal to a first reference value, and open a sluice gate that introduces the liquid to the water tank a predetermined period after opening the discharge valve, the first reference value being lower than a saturation concentration;

after the water amount controlling device opens the discharge valve and the sluice gate, throttle the discharge valve to reduce a flow of the discharge of the liquid from the water tank and the sluice gate to reduce a flow of introducing the liquid to the water tank, if the impurity concentration measured by the concentration sensor is higher than or equal to a second reference value and the temperature measured by the temperature sensor is lower than or equal to a third reference value, the second reference value being lower than the first reference value; and after the water amount controlling device throttles the discharge valve and the sluice gate, close the discharge valve if the impurity concentration measured by the concentration sensor is lower than the second reference value, and close the sluice gate a predetermined period after closing the discharge valve.

* * * * *